(12) United States Patent
Lippuner

(10) Patent No.: US 7,199,355 B2
(45) Date of Patent: Apr. 3, 2007

(54) METHODS AND APPARATUSES FOR THE EXACT DETERMINATION OF AN ANGLE OF ROTATION

(75) Inventor: Heinz Lippuner, Rebstein (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 11/216,217

(22) Filed: Aug. 31, 2005

(65) Prior Publication Data

US 2006/0049342 A1 Mar. 9, 2006

(30) Foreign Application Priority Data

Sep. 3, 2004 (CH) .................................... 1463/04

(51) Int. Cl.
*G01D 5/34* (2006.01)
(52) U.S. Cl. ........................... 250/231.13; 250/231.16; 33/1 PT; 341/13
(58) Field of Classification Search ........... 250/231.13, 250/231.14, 231.16, 231.18; 33/1 N, 1 PT; 341/9, 11, 13; 356/617
See application file for complete search history.

(56) References Cited

U.S. PATENT DOCUMENTS 4,547,667 A 10/1985 Sasaki et al.
5,214,426 A 5/1993 Minohara et al.
6,958,468 B2 * 10/2005 Kataoka ................. 250/231.13

FOREIGN PATENT DOCUMENTS

| DE | 1811961 | 6/1970 |
| JP | 60031011 A | 2/1985 |
| JP | 13170010 A | 7/1991 |

* cited by examiner

*Primary Examiner*—Kevin Pyo
(74) *Attorney, Agent, or Firm*—John K McCulloch

(57) ABSTRACT

In a method according to the invention for the accurate determination of an angle of rotation (w) about an axis (a), at least a part of a plurality of pattern elements (5, ..., 13) arranged around a pattern center (4), a multiplicity of which are arranged one behind the other in a rotation, is at least partly focused by optical beams on a multiplicity of detector elements (2) of an optical detector (1) which are arranged in series. The pattern elements (5, ..., 13) are arranged on a rotating body (3) which is connected to the detector (1) so as to be rotatable about the axis (a). Positions (p) of the focused pattern elements are resolved by the detector elements (2) of one and the same detector (1). In a first step, effects of an eccentricity (e) of the pattern center (4) relative to the axis (a) on the determination of an angle of rotation are computationally determined from resolved positions (p) of at least one pattern element (5, ..., 13). In a second step, the angle of rotation (w) is accurately determined from the resolved positions (p1, p2, p3) of pattern elements (5, 6, 7) arranged one behind the other taking into account the effects determined.

21 Claims, 6 Drawing Sheets

Figure 1:
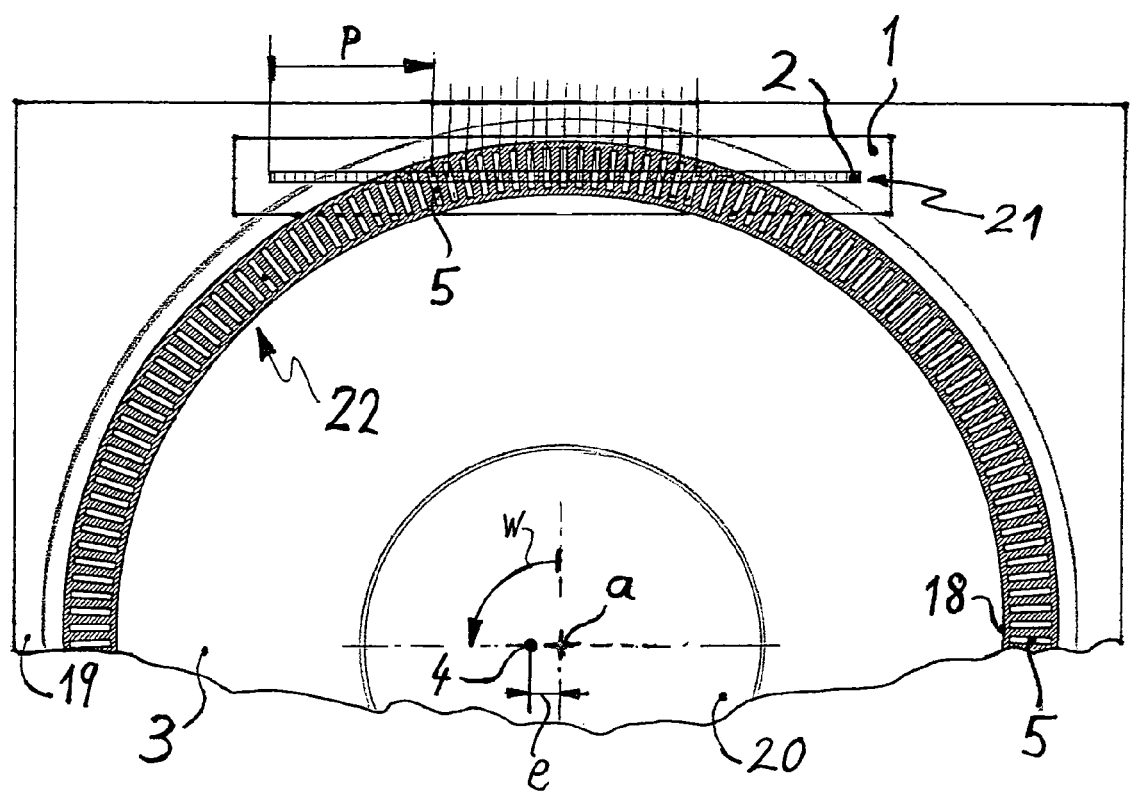

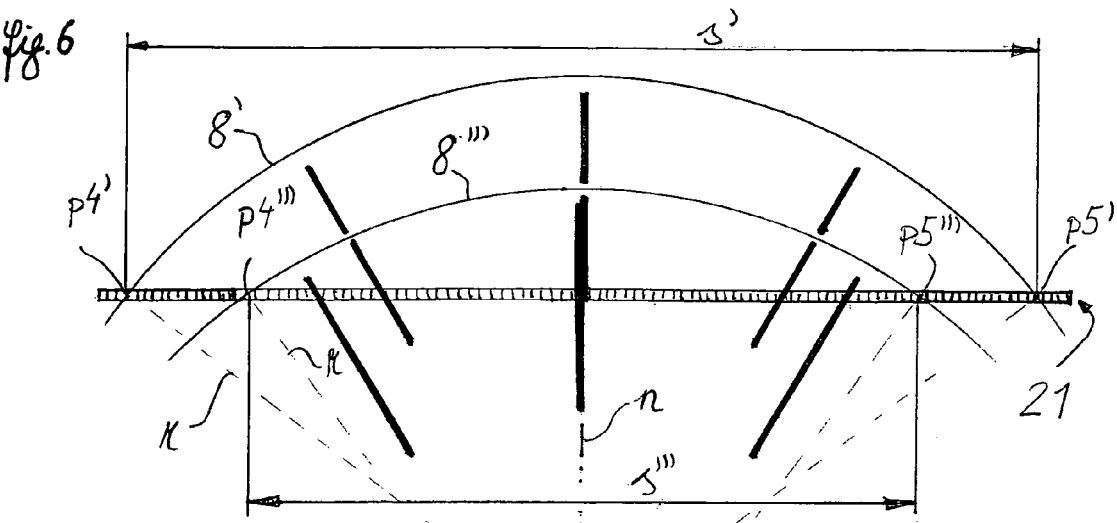
Fig.6
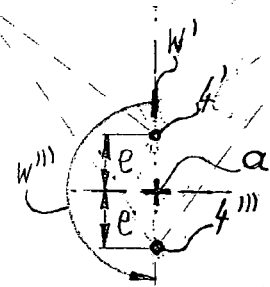
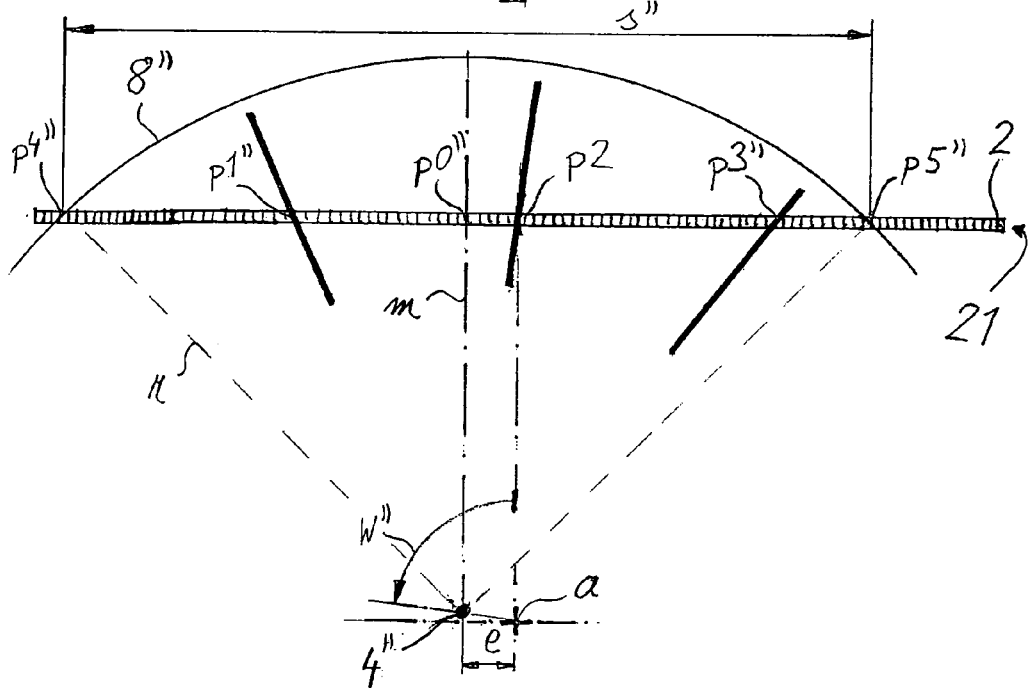

METHODS AND APPARATUSES FOR THE EXACT DETERMINATION OF AN ANGLE OF ROTATION

The invention relates to a method for the exact determination of an angle of rotation by means of an optical detector having a multiplicity of detector elements arranged in series and by means of a rotating body having a multiplicity of pattern elements arranged around a pattern center and an apparatus for the exact determination of an angle of rotation.

Such methods and apparatuses for the exact determination of an angle of rotation have been used for many years, inter alia as rotary encoders in measuring apparatuses, in particular in geodetic and industrial surveying. By means of such methods and apparatuses, it is even possible, with corresponding precautions to resolve a full circle into over one million units with an accuracy of measurement of the order of magnitude of a few angular seconds.

In order to be able to achieve such high accuracies, firstly the detector must be arranged in a positionally stable manner relative to a bearing by means of which the rotating body is mounted so as to be rotatable about an axis relative to the detector. Secondly, high dimensional and shape accuracy of the rotating body, in particular the arrangement and formation of pattern elements arranged on the rotating body in the direction of rotation one behind the other about a pattern center, is an essential precondition. In addition to partial graduation inaccuracies which are due to deviations of the predetermined distances between individual pattern elements arranged one behind the other and/or to deviations of the dimensions of the pattern elements themselves, a distance of the pattern center from the axis, a so-called eccentricity of the pattern center relative to the axis, often makes it impossible in practice to achieve required accuracies. Because manufacturing tolerances are always present, every rotating body has an eccentricity which as a rule has a constant value. Concentricity deviations of the bearing moreover make a contribution to the eccentricity. If significant loads due to forces act on parts of the apparatus during the determination of angles of rotation—particularly in the case of heavy measuring objects—eccentricities dependent on the angle of rotation or changing as a function of time can occur.

U.S. Pat. No. 5,214,426 discloses, inter alia, an apparatus for the determination of an angle of rotation, which apparatus has a rotor body with an optical pattern, a single CCD line sensor and a data generation means for generating angle data from the output data of the CCD line sensor. The single CCD line sensor has a one-dimensional position-resolving region and is oriented substantially perpendicularly to the radial direction of the rotor body. The rotor body is divided into sectors of ten degrees in each case and has, as a pattern in these sectors, radially oriented slits which are in the form of digital code patterns for absolute angle measurement. Although a high resolution is achieved during the measurement of angles of rotation by the simultaneous resolution of a plurality of slits, the achievable accuracy of measurement is limited, inter alia, by the eccentricity error.

The introduction of U.S. Pat. No. 4,580,047 discloses an angle measuring means having an incremental slit pattern and two sensing points diametrically opposite one another and each having a sensing unit. Two periodic sensing signals are measured via the two sensing points. An eccentricity error of the angle to be measured, which originates from a displacement of the midpoint of the rotating body relative to the axis of rotation, can be determined with high accuracy from the mutual phase position of the two sensing signals.

DE-A 18 11 961 describes an arrangement for adjusting angular positions which provides at least one pair of sensing units diametrically opposite one another at at least two sensing points. Four periodic sensing signals which are phase-shifted relative to one another due to an existing eccentricity and are superposed one on the other in an analog form, so that, inter alia, eccentricity errors, for example of the positioning of the part-disk, can be compensated are measured at the four sensing points.

It is an object of the invention to remedy deficiencies of the prior art. Thus, it is intended to propose a method for an apparatus which is simple in design and which has an optical detector with a multiplicity of detector elements arranged in series and a rotating body having a multiplicity of pattern elements arranged one behind the other in the direction of rotation, which method permits an accurate determination of the angle of rotation. It is also intended to propose an apparatus which has an optical detector with a multiplicity of detector elements arranged in series and a rotating body having a multiplicity of pattern elements arranged one behind the other in the direction of rotation, by means of which apparatus an angle of rotation can be accurately determined—in spite of its simple design.

This object is achieved by a method and an apparatus for the accurate determination of an angle of rotation, having the features hereinafter described.

In a method according to the invention for the accurate determination of an angle of rotation about an axis, at least a part of a multiplicity of pattern elements arranged around a pattern center, of which a multiplicity are arranged one behind the other in the direction of rotation, is at least partly focused by means of optical beams on a multiplicity of detector elements of an optical detector which are arranged in series. The pattern elements are arranged on a rotating body which is connected to the detector so as to be rotatable about the axis. Positions of the focused pattern elements are resolved by means of the detector elements of one and the same detector. In a first step, effects of an eccentricity of the pattern center relative to the axis on the determination of an angle of rotation are determined computationally from resolved positions of at least one of the pattern elements. In a second step, the angle of rotation is determined accurately from the resolved positions of pattern elements arranged one behind the other, taking into account the effects determined.

In a further development of the method according to the invention, in the first step, pattern elements arranged one behind the other are combined into at least two groups by means of an intermediate step and at least two group positions are determined computationally from the resolved individual positions of the pattern elements combined in each case. Effects of the eccentricity on the determination of the angle of rotation are then determined computationally from the at least two group positions determined. This can be effected with higher accuracy by means of the group positions determined.

An apparatus according to the invention for the accurate determination of an angle of rotation has an optical detector which comprises a multiplicity of detector elements arranged in series, and a rotating body which comprises a multiplicity of pattern elements arranged around a pattern center, of which a multiplicity is arranged one behind the other in the direction of rotation. The rotating body is connected to the detector so as to be rotatable about an axis. At least a part of the pattern elements can be focused at least partly on detector elements by means of optical beams. Positions of the focused pattern elements can be resolved by means of the detector elements of one and the same detector.

In this apparatus, the pattern elements and the detector elements are formed and arranged in such a way that effects of an eccentricity of the pattern center relative to the axis on the determination of an angle of rotation can be automatically determined computationally from resolved positions of at least one of the pattern elements and the angle of rotation can be accurately determined from resolved positions of pattern elements arranged one behind the other, taking into account the effects of the eccentricity of the angle of rotation.

Since both the effects of an eccentricity on the determination of the angle of rotation can be computationally determined by means of one and the same detector and the angle of rotation about an axis can be accurately determined, apparatuses according to the invention for the exact determination of an angle of rotation with high resolution can be realized with a very wide range of advantages. Firstly, a simple and economical apparatus for the accurate determination of an angle of rotation can be realized. Since the determination of the effects of an eccentricity and the determination of the angle of rotation taking into account the effects are determined by means of one and the same detector with one and the same position-resolving region, a high accuracy and ruggedness of such an apparatus can also be achieved. Furthermore, it is possible to perform both functions with the same positions of pattern elements, which positions are resolved at the same time.

Further alternative or advantageous developments or further developments of the invention are described in the dependent patent claims.

Figure 2:
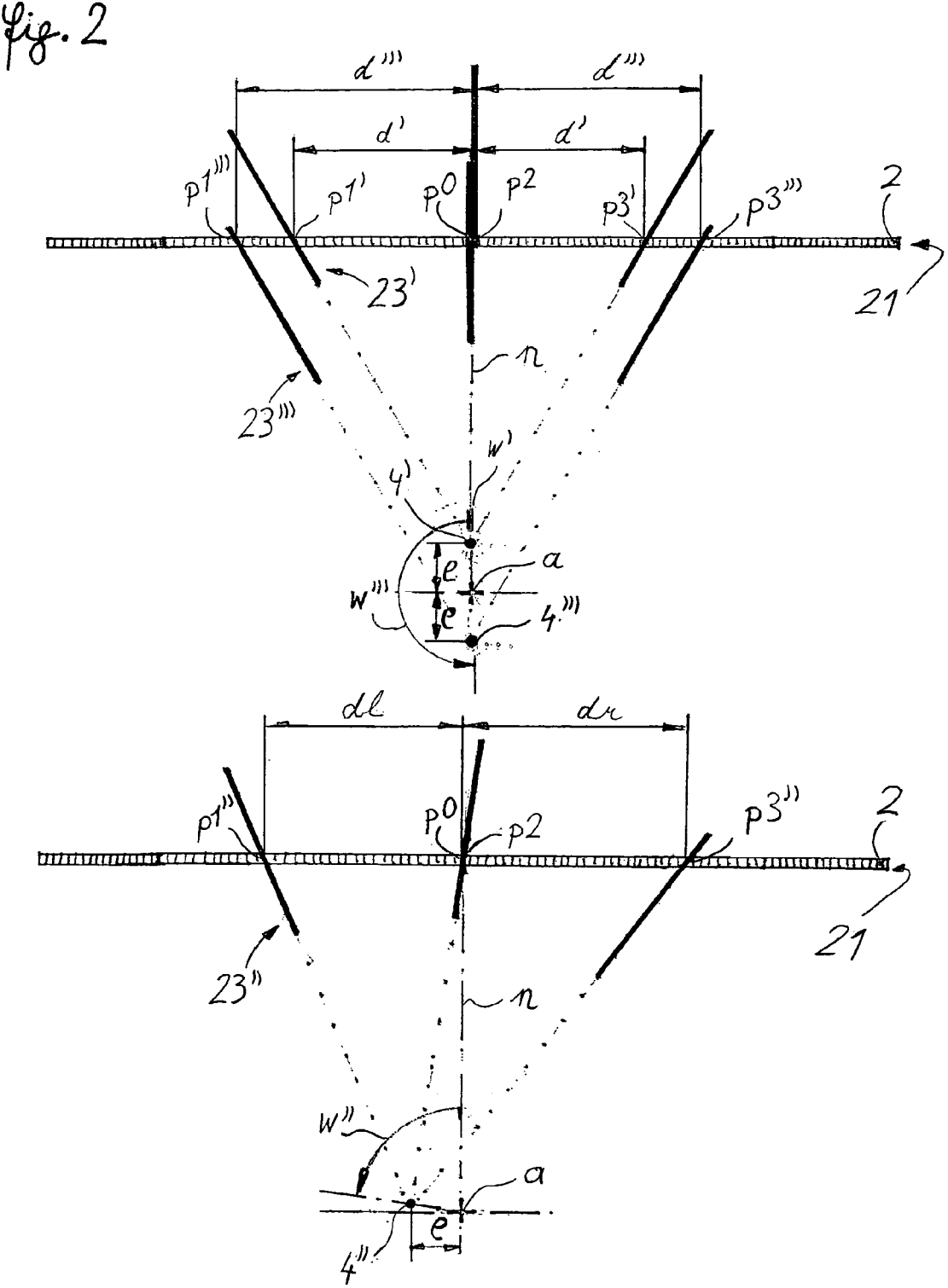
Figure 3:
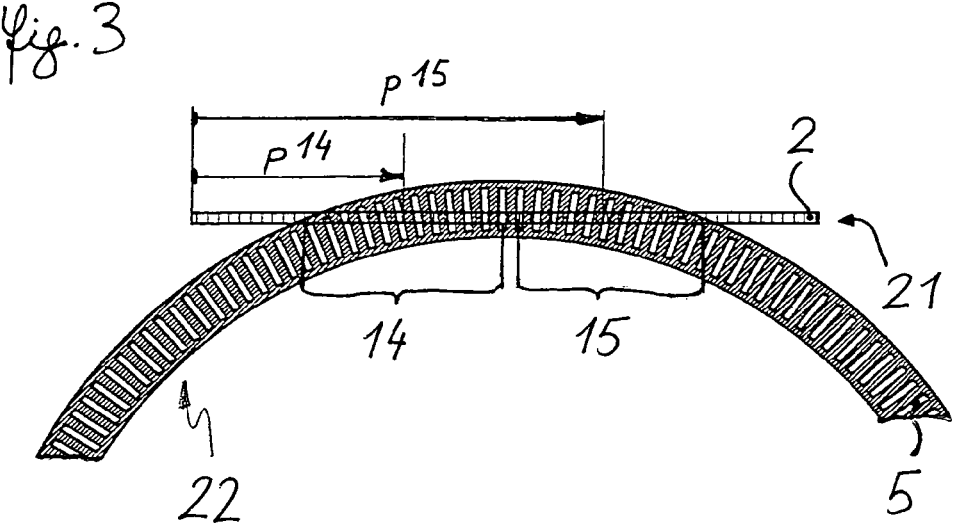
Figure 4:
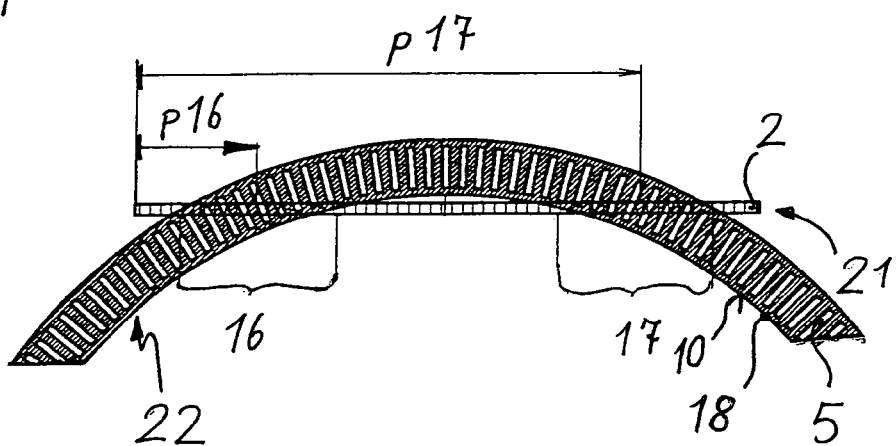
Figure 5:
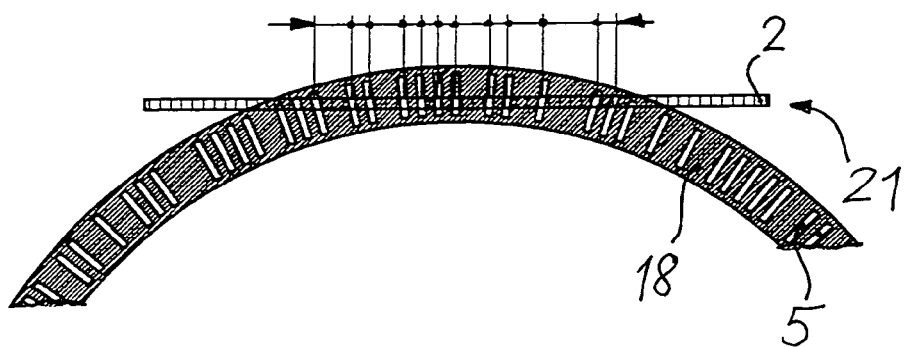
Figure 7:
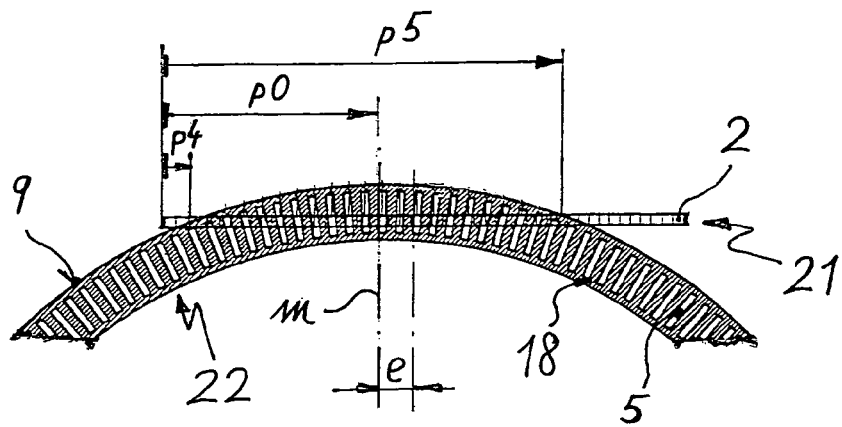
Figure 8:
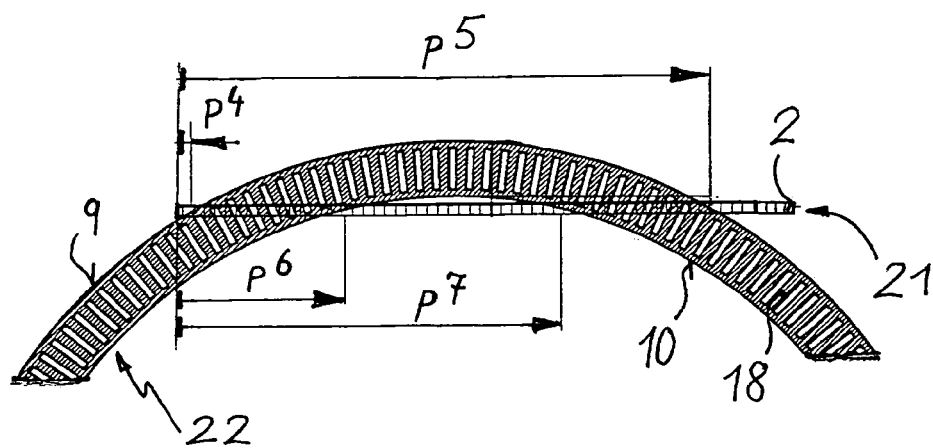
Figure 9:
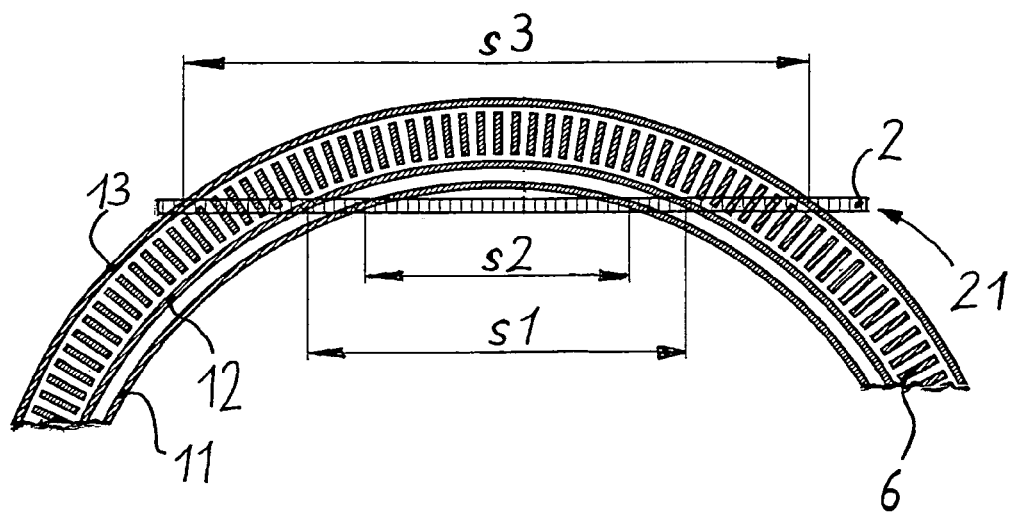
Figure 10:
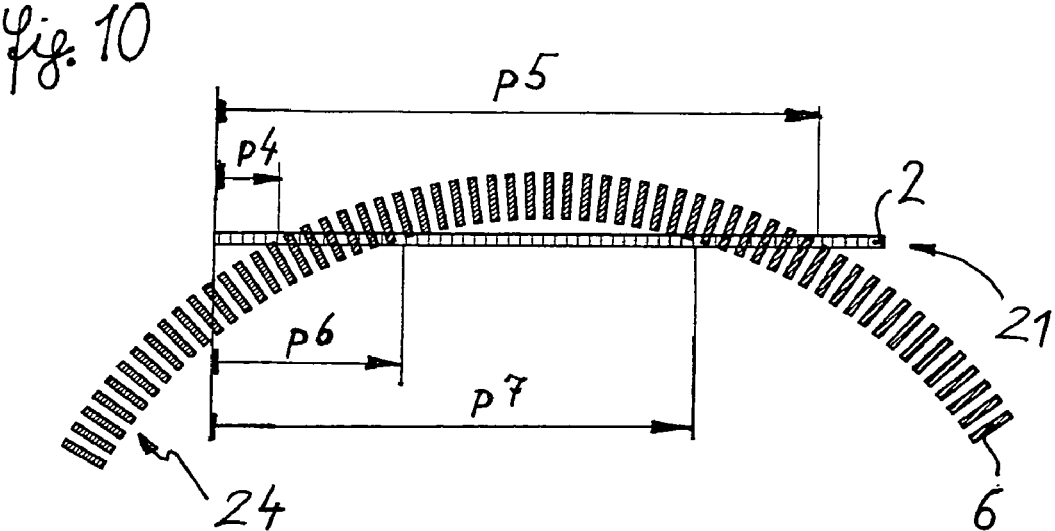
Figure 11:
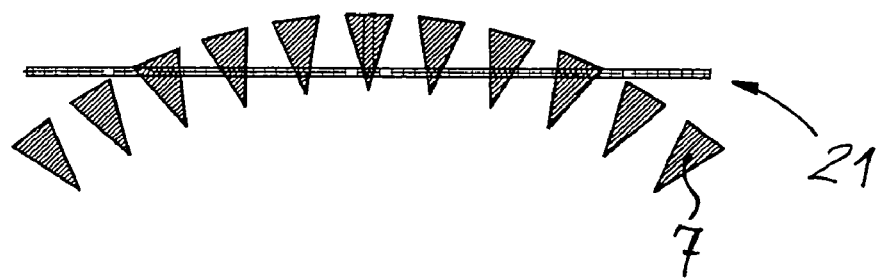

Below, embodiments of apparatuses according to the invention and embodiments of methods according to the invention for the accurate determination of an angle of rotation are explained in more detail purely by way of example with reference to drawings. The figures show the following as a partial view from above:

FIG. 1 shows a first embodiment of an apparatus according to the invention,

FIG. 2 shows two schematic diagrams of an apparatus illustrating embodiments of methods according to the invention, FIG. 3 shows the pattern elements and the detector elements of the first embodiment, FIG. 4 shows a second embodiment in which the detector elements intersect the pattern elements in the form of a secant, FIG. 5 shows a third embodiment with pattern elements which permit an absolute determination of the angle of rotation, FIG. 6 shows two schematic diagrams of a further apparatus illustrating alternative embodiments of methods according to the invention, FIG. 7 shows a pattern element of the first embodiment, which pattern element is symmetrical with respect to the pattern center, FIG. 8 shows two pattern elements of the second embodiment, which pattern elements are symmetrical with respect to the pattern center, FIG. 9 shows a fourth embodiment comprising opaque pattern elements, of which three pattern elements are symmetrical with respect to the pattern center, FIG. 10 shows a fifth embodiment comprising opaque pattern elements and FIG. 11 shows a sixth embodiment comprising triangular pattern elements.

FIG. 1 shows a first embodiment of an apparatus according to the invention for the accurate determination of an angle of rotation was partial view from above. The two angle encoders of a theodolite could be formed to correspond to this embodiment. The embodiment comprises a rotating body, which in this case is in the form of a disk-like glass circle 3, and an optical detector, which in this case is in the form of CCD line array 1 in all embodiments. The invention is of course limited neither to CCD nor to line array detectors. Thus, the accuracy of the angle determination could be further increased by means of, for example, a corresponding CMOS area array detector. The CCD line array 1 and a bearing not shown in FIG. 1 are fixed to a baseplate 19. By means of the bearing, a shaft 20 is connected to the baseplate 19 and the CCD line array 1 so as to be rotatable about an axis a. In this embodiment, the angle of rotation w of the shaft 20 about the axis a can be determined relative to the CCD line array 1 within an accuracy of, for example, five angular seconds.

Here, the glass circle 3 has an annular pattern 22 comprising a multiplicity of pattern elements which are arranged one behind the other around a pattern center 4 in the direction of rotation and all of which are the same distance away from the pattern center 4. The pattern elements are in the form of rectangular, transparent slits 5 and are incorporated by recesses in an opaque material layer 18 applied in an annular manner on the glass circle 3. Here, the transparent slits 5 are radially oriented and are arranged the same distance apart in each case. An incremental determination of the angle of rotation w is thus possible. The glass circle 3 is fixed, for example by means of an adhesive, to the shaft 20. When fixing the glass circle 3, it is in practice not possible to prevent a distance between the axis a and the pattern center 4—a so-called eccentricity e of the pattern center 4 relative to the axis a. In the case of an angle encoder of a theodolite having a glass circle 3 of, for example, seventy millimeters in diameter, the eccentricity e is typically within a few micrometers. For greater clarity, the eccentricity e is shown in more than a thousand times magnification in the figures. In the position of the glass circle 3 shown in FIG. 1, the pattern center 4 is offset in the direction of extension of the CCD line array 1 relative to the axis a. In this position of the glass circle 3, the effects of the eccentricity e on a determination of the angle of rotation w are the greatest.

The optical detector is composed of a multiplicity of photosensitive detector elements 2—for example a thousand such detector elements—which together form a position-resolving region 21. The individual detector elements 2 have, for example, a size of fourteen times fourteen micrometers. According to a further development of the invention, the position-resolving region 21 here has dimensions such that it extends, at least on one side, beyond the focused part of the circular pattern 22. In the CCD line array 1, the detector elements 2 are arranged in series in the form of a single straight line substantially in the direction of rotation and thus form a linear, position-resolving region 21 which is oriented perpendicularly to the radial direction.

Here, by means of a light source not shown, optical beams are projected perpendicularly to the plane of the drawing onto a region of the annular pattern 22. Projected beams are absorbed by the opaque material layer 18 or can pass through the transparent slits 5, with the result that a part of the pattern 22 is focused by a plurality of transparent slits 5 on the position-resolving region 21 of the CCD line-array 1 as light and dark regions. By means of the photosensitive detector elements 2, positions p are coordinated in a manner known per se with the light regions of the focused transparent slits 5. Here, the resolved positions p correspond to the distances between the left end of the position-resolving region 21 and the respective centers of gravity of the light regions of the slits 5. However, it is also possible to coordinate a position with a pattern element on the basis of light-dark transitions.

According to the invention, the resolved positions p are transmitted to a computing and evaluating unit known per se and not shown here, for determining the effects of the eccentricity e and for subsequent accurate determination of the angle of rotation w.

In the figures below, for the sake of simplicity, only the position-resolving region 21 comprising the detector elements 2 and a part of the respective pattern comprising the respective pattern elements of the various embodiments of apparatuses according to the invention are shown in each case.

FIG. 2 shows, as two partial figures, two schematic diagrams with an apparatus corresponding to the first embodiment, in three different positions of a half rotation. The upper partial figure shows the apparatus in the start and end position at an angle of rotation w' and w''', respectively, of zero and one hundred and eighty degrees, respectively. The lower partial figure shows the apparatus in the intermediate position at an angle of rotation w'' of not quite ninety degrees. Embodiments of a method according to the invention for an exact determination of an angle of rotation are discussed purely by way of example with reference to the schematic diagrams. In these methods, the effects of the eccentricity e on the determination of an angle of rotation are determined computationally with the aid of pattern elements arranged one behind the other in the direction of rotation.

The two schematic diagrams show twice the linear, position-resolving region 21 from FIG. 1 and three line patterns 23', 23'' and 23'''. The three line patterns 23', 23'' and 23''' are sections of one and the same line pattern in one of the three positions in each case. The incrementally formed line pattern greatly simplified for the sake of clarity consists here of twelve linear pattern elements which are the same distance apart in each case and of which only three are shown here in each case.

The linear pattern elements of the three line patterns 23', 23'' and 23''' are the same distance away from the respective pattern center 4', 4'' and 4''', respectively, and are arranged in each case one behind the other in the direction of rotation. According to the first embodiment, the three pattern centers 4', 4'' and 4''' also each have the eccentricity e relative to the axis a.

In a first embodiment of a method according to the invention, an arbitrary angle of rotation can be accurately determined using the geometrical characteristics of the apparatus via the resolved positions p1', p1''', p2, p3' and p3''' of the respective left, middle and right pattern elements of the line pattern 23' and 23''', as follows, by means of two steps.

In a first step—as shown in the upper partial figure of FIG. 2—the angles of rotation w' and w''' of the start position and of the end position of a half rotation are chosen so that the two distances d' between the positions p2 and p1' and the positions p3' and p2 and the two distances d''' between the positions p2 and p1''' and the positions p3''' and p2 are identical in each case. The two pattern centers 4' and 4''' are thus in a plane n which is perpendicular to the position-resolving region 21 and in which the axis a lies. In the start position, the pattern center 4' is located between the position-resolving region 21 and the axis a, while in the end position a half rotation later the axis a is between the position-resolving region 21 and the pattern center 4'''. Thus, the eccentricity e has effects neither on the determination of the angle of rotation w' nor on that of the angle of rotation w'''. In the end position, the line pattern 23''' is offset relative to the line pattern 23' of the start position only perpendicularly to the position-resolving region 21.

The resolved position p2 of the respective middle pattern element, which position lies in the plane n, remains unchanged thereby, whereas the positions p1' and p3' change to the positions p1''' and p3''' in the case of the respective left and right pattern element not oriented perpendicularly to the position resolving region 21.

By a comparison of the resolved positions p1' and p1''' and/or of the positions p3' and p3''' of both positions of the left and/or of the right pattern elements, the magnitude of the eccentricity e can be determined computationally. Based on the geometrical situations shown here, the magnitude of the eccentricity e corresponds to half the difference between the respective resolved position p1' and p1''' of the left pattern element multiplied by the tangent of the angle of sixty degrees, the angular difference between the directions of extension of the left pattern element and the position-resolving region 21. Since the situations for the right pattern element are the same here, the accuracy of the eccentricity e can be increased by additionally taking into account the difference between the resolved position p3' and p3''' in the computational determination. It is obvious that, in the case of a finer pattern with further pattern elements focused on the position-resolving region, the accuracy of the computational determination could be even further increased.

In a manner known per se, the effects of the eccentricity e in a determination of an arbitrary angle of rotation are proportional to the magnitude of the determined eccentricity e multiplied by the sine of the arbitrary angle of rotation relative to a reference angle at which the eccentricity e has no effects on the determination of an angle of rotation. With a knowledge of the start position and of the end position and the magnitude of the eccentricity e, it is now possible here to determine the effects of the eccentricity e on the determination of an arbitrary angle of rotation computationally.

In a second step, taking into account the effects determined, any arbitrary angle of rotation can now be accurately determined from the then resolved positions of the left, of the middle and of the right linear pattern element relative to a reference position p0 on the position-resolving region 21. The reference position p0 is likewise in the plane n here and coincides with the resolved position p2. In the case of the accurate determination from the resolved positions of the focused pattern elements relative to the reference position p0, a nonlinear distortion of the resolved positions, which is due to the linear arrangement of the detector elements 2 and the nonlinear arrangement of the pattern elements arranged one behind the other around the respective center pattern 4' and 4''', is computationally equalized in a manner known per se relative to the reference position p0.

In a second embodiment of a method according to the invention, for example, the resolved position of the respective right pattern element is recorded during a full revolution for each resolution of the predetermined position p1''' from the upper part-figure of the respective left pattern element, in order subsequently to determine computationally, by means of a balancing calculation which takes account of the geometrical circumstances of the apparatus, the magnitude of the eccentricity e and the coordinated reference angle. With these two computationally determined values, each angle of rotation can then be accurately determined taking into account the effects of the eccentricity e.

In a third embodiment of a method according to the invention, an angle of rotation can be accurately determined as follows, starting from a knowledge of the position of the plane n. If—as shown in the lower part-figure of FIG. 2—the angle of rotation w" of the intermediate position of not quite 90 degrees is chosen so that the position p2 of the middle of the three pattern elements is resolved at the reference position p0, the positions p1" and p3" of the left and right pattern elements, respectively, are resolved by means of the detector elements 2.

On the basis of the geometrical circumstances of the pattern elements arranged one behind the other, the effects of the eccentricity e on the determination of the angle w" can be computationally determined here directly from the ratio of the distances dl to dr between the positions p2 and p1" or positions p3" and p2. Taking into account the effects of the eccentricity e which are computationally determined in this manner, it is then possible to determine the angle of rotation w" accurately on the basis of the resolved positions p1", p2 and p3" relative to the reference position p0. With a knowledge of the plane n, this embodiment of the method can also be used for positions of the middle pattern element on the other side of the reference position p0. Here too, it is possible even further to increase the accuracy of the computational determination with further pattern elements of a finer pattern which are focused on the position-resolving region.

With reference to an angle encoder of a theodolite according to the first embodiment from FIG. 1, the difference between the two resolved positions p of the outermost left pattern element 5 could be two micrometers, for example in the case of a half rotation, corresponding to FIG. 2. Since the direction of extension of the outermost left pattern element 5 and the direction of extension of the position-resolving region 21 have an angular difference of 75 degrees, the eccentricity e of the pattern center 4 relative to the axis a would have approximately a magnitude of not quite four micrometers. The other pattern elements 5 lying on the position-resolving region 21 could of course additionally be used for increasing the accuracy for the computational determination of the eccentricity e. For geometrical reasons, the difference between the respective resolved positions would be the smaller the closer the angle of difference between the directions of extension of the respective pattern element 5 and of the position-resolving region 21 were to an angle of 90 degrees.

FIG. 3 shows the position-resolving region 21 with the detector elements 2 and a section of the circular pattern 22 with the slits 5 of the first embodiment. A fourth embodiment of the method according to the invention will be discussed with reference to this figure.

For the computational determination of the effects of an eccentricity on the determination of an angle of rotation, in this method, in a first step, the slits 5 are combined here into a left and a right group 14 and 15 with about ten slits 5 in each case. In a second step, in each case a middle group position p14 or p15, respectively, is coordinated with the two groups 14 and 15 bordering one another, taking into account in the calculation the nonlinear distortion which is due to the linear arrangement of the detector elements 2 and the nonlinear arrangement of the slits 5 arranged one behind the other around the pattern center. In a third step, the effects of an eccentricity e on the determination of the angle of rotation can then be computationally determined from the two resolved group positions p14 and p15, analogously to, for example, the second embodiment of a method according to the invention. The determination of the angle of rotation can then be effected while taking into account the determined effects of the eccentricity in the manner already mentioned.

However, it would also be conceivable to provide, for example, the edge positions of the groups as group positions instead of the middle group positions. It would also be conceivable to determine the positions of more than two groups. The combination of pattern elements arranged one behind the other into groups and the computational determination of the respective group position thereof have advantages with respect to the achievable accuracy in the computational determination of the effects.

FIG. 4 shows a second embodiment of an apparatus according to the invention which, apart from the arrangement of the position-resolving region 21, is identical to the first embodiment. Here, the position-resolving region 21 formed by the detector elements 2 is arranged a shorter distance away from the axis a from FIG. 1 in comparison with the first embodiment. The fourth embodiment of a method for the accurate determination for—in contrast to FIG. 3—groups 16 and 17 of pattern elements arranged one behind the other will be discussed on the basis of this figure.

By means of the shorter distance, the circular pattern 22 having the slits 5 of the position-resolving region 21 is also intersected by the inner line 10 of the opaque material layer 18. A plurality of slits 5 are focused on two separate sections of the position-resolving region 21. Between the two sections, there is a plurality of detector elements 2, onto which no pattern is focused, with the result that the two groups 16 and 17 which are a distance apart are separated from one another on both sides by slits 5 not focused on the detector elements 2 and arranged one behind the other.

By means of the detector elements 2 positioned more closely to the axis a from FIG. 1, it is possible, compared with the first embodiment in FIG. 3, to resolve group positions p16 and p17 located further apart to give groups of combined slits 5. This permits a more accurate computational determination of the effects of the eccentricity on the determination of an angle of rotation.

FIG. 5 shows a third embodiment of an apparatus according to the invention, which embodiment, apart from the arrangement of the slits 5 within the annular, opaque material layer 18, is identical to the first embodiment. In contrast to the preceding embodiments, the slits 5 are arranged different distances apart. Here, this arrangement results in a coding which makes it possible unambiguously to coordinate in each case one angle of rotation with each position of the apparatus via distances between a plurality of slits 5 arranged one behind the other, and thus to determine the angle of rotation absolutely. Of course, other possibilities for coding—for example a variation of the width of the slits 5—would also be conceivable. Since the different distances between the respective slits 5 are known, every angle of rotation can be determined by a single focusing of a plurality of slits 5 absolutely with respect to the detector elements 2. In all examples and embodiments of apparatuses and methods according to the invention for the accurate determination of an angle of rotation, the patterns to be at least partly focused onto the detector elements 2 can in principle be in coded form.

FIG. 6 shows the two schematic diagrams of the apparatus from FIG. 2 in the same three positions at the angles of rotation w', w" and w'", the line pattern comprising the twelve pattern elements arranged one behind the other around the pattern center being additionally provided here with a pattern element symmetrical with respect to the same pattern center. This pattern element symmetrical with respect to the pattern center is in the form of a circle here. Three arcs 8', 8" and 8'" are sections of one and the same circle in one of the three positions in each case. The radius r of the circle is chosen so that the position-resolving region 21 intersects the circle in the form of a secant. On the basis of the two schematic diagrams, alternative embodiments of a method according to the invention for the accurate determination of an angle of rotation will be discussed purely by way of example. In these methods, in contrast to the preceding methods, the effects of the eccentricity e are determined computationally with the aid of the symmetrical pattern element.

In a fifth embodiment of a method according to the invention, an arbitrary angle of rotation can be accurately determined as follows utilizing the geometrical circumstances of this apparatus from the resolved positions p4', p4''', p5' and p5''' of the arcs 8' and 8'''.

If—as shown in the upper part-figure of FIG. 6—the angles of rotation w' and w''' of the start position and of the end position of the half rotation are chosen so that the chord length s' between the positions p4' and p5' is maximum and the chord length s''' between the positions p4''' and p5''' is minimum, the two pattern centers 4' and 4''' lie in the plane n which is perpendicular to the position-resolving region 21 and in which the axis a lies. Here, the eccentricity e thus has no effects either on the determination of the angle of rotation w' or on that of the angle of rotation w'''.

By comparison of the chord lengths s' and s''' of the arcs 8' and 8''' of the two positions, the magnitude of the eccentricity e can be computationally determined on the basis of the known radius r and Pythagoras' theorem. It is obvious that, in the case of a more complicated pattern comprising further pattern elements focused on the position-resolving region 21 and symmetrical with respect to the pattern center, the accuracy of the computational determination could be even further increased.

In a sixth embodiment of a method according to the invention, in each case at least one resolved position of the circle or the chord length is recorded—in a manner analogous to the second embodiment—during a full rotation at a plurality of angles of rotation—for example six or twelve angles of rotation. Since there is a unique functional relationship between the position or the chord length and eccentricity e, the magnitude of the eccentricity e and the reference angle for the angle of rotation can be computationally determined using a balancing calculation, with the result that an arbitrary angle of rotation can be accurately determined taking into account the effects of the eccentricity e.

In a seventh embodiment of a method according to the invention, an arbitrary angle of rotation can be accurately determined as follows on the basis of the parts of the circle which are focused on the position-resolving region 21, taking into account the eccentricity e.

In the intermediate position having the angle of rotation w'' of not quite 90 degrees, the two positions p4'' and p5'' of the arc 8'' are resolved—as shown in the lower part-figure of FIG. 6—via the detector elements 2. By calculating the mean value of the two resolved positions P4'' and p5'', the instantaneous reference position p0'' can be computationally determined here for the resolved positions p1'', p2 and p3'' of the linear pattern elements arranged one behind the other, for the accurate determination of the angle of rotation w''.

The pattern center 4'' now lies in a plane m which is perpendicular to the position-resolving region 21 and in which the reference position p0'' determined lies, with the result that the eccentricity e no longer has any effect on the determination of the angle of rotation w''. A determination of the magnitude of the eccentricity e and of the coordinated reference angle is thus no longer necessary at all.

FIG. 7 shows the annular pattern 22 and the position-resolving region 21 of the first embodiment in the position shown in FIG. 1. Not shown here is the fact that the pattern center 4 is offset relative to the axis a in the direction of extension of the position-resolving region 21. In this position, the effects of the eccentricity e on the determination of an angle of rotation are the greatest.

These effects are computationally determined here—according to a seventh embodiment of a method according to the invention—not from the resolved positions of the slits 5 arranged one behind the other but from the resolved positions p4 and p5 of a circular pattern element symmetrical with respect to the pattern center. Here, the circular pattern element is embodied by a sharply bounding outer line 9 of the opaque material layer 18 of the annular pattern 22.

The positions p4 and p5 of the two light-dark transitions of the focused outer line 9 are resolved by means of the detector elements 2, and the instantaneous reference position p0 is computationally determined by calculating the mean value. Since here both the instantaneous reference position p0 and the pattern center of the pattern elements which is not shown lie in the plane m perpendicular to the detector region 21, the effects of the eccentricity e have already been taken into account via the instantaneous reference position p0 for the resolved positions of the focused slits 5 when determining the instantaneous angle of rotation. A separate computational determination of the eccentricity e or of the coordinated reference angle is thus no longer necessary. This is of major importance especially in the case of eccentricities which are variable as a function of time—for example due to mechanical loads of the apparatus which are variable as a function of time.

FIG. 8 shows the annular pattern 22 and the position-resolving region 21 of the second embodiment from FIG. 4 in the position shown in FIG. 1, in which the position-resolving region 21 comprising the detector elements 2 is arranged a shorter distance from the axis in comparison with the first embodiment. Consequently, not only—as in FIG. 7—the two positions p4 and p5 of the outer line 9 but also the two positions p6 and p7 of the sharply bounding inner line 10 of the opaque material area 18 of the annular pattern 22 can be resolved here and additionally used in a computational determination of the effects of the eccentricity. Thus, the accuracy in the determination of the effects can be increased.

FIG. 9 shows a fourth embodiment of an apparatus according to the invention, comprising a further pattern, the position-resolving region 21 comprising the detector elements 2 having an even shorter distance to the axis a not shown here—in comparison to the second embodiment. Here, the further pattern has firstly pattern elements in the form of opaque bars 6 and arranged one behind the other in the direction of rotation around the pattern center, and secondly three pattern elements in the form of opaque, concentric rings 11, 12, 13 and symmetrical with respect to the pattern center, which pattern elements are in each case separated from one another by a distance.

The computational determination of the magnitude of the eccentricity e is effected here by measuring the change in the length of the chord of a secant through one of the rings 11, 12, 13 in different positions for different angles of rotation, which length is resolved by means of the detector elements 2. Since there is a unique functional relationship between the respective chord lengths s1, s2 and s3 and the eccentricity e, the eccentricity e can be determined—according to the sixth embodiment of a method according to the invention —for each angle of rotation by recording the respective chord lengths s1, s2, s3 as a function of the angle of rotation in a calibration process.

The sensitivity of the measurement is all the greater the smaller the distance of the secant from the periphery of the pattern element symmetrical with respect to the pattern center—in this case one of the rings 11, 12 and 13. For example, in the case of a thin ring having a radius of about 35 millimeters and a position-resolving region 21 a distance of two and a half millimeters away therefrom, the chord length changes by plus/minus five micrometers per micrometer magnitude of the eccentricity and, at a distance of one tenth of a millimeter, even by plus/minus 26 micrometers per millimeter magnitude of the eccentricity.

As is evident from FIG. 9, the chord lengths of a plurality of secants are measured by the three rings 11, 12, 13. The points of intersection of the secants with both the respective outer lines and the respective inner lines of the three thin rings 11, 12, 13 can be used thereby for the chord length determination. The magnitude of the eccentricity e can thus be computationally determined on the basis of a plurality of values. Of course, in the computational determination of the eccentricity and/or of the effects thereof on a determination of the angle of rotation, it is additionally possible to take into account the information from the resolved positions of the pattern elements arranged one behind the other in the direction of rotation—in this case of the bars 6.

FIG. 10 shows a fifth embodiment which differs from the second embodiment from FIG. 4 only in the pattern focused here as bar pattern 24. Here, the bar pattern 24 likewise has a multiplicity of identical pattern elements which are arranged one behind another the same distance apart in the direction of rotation around a pattern center but which are in the form of opaque, radially oriented bars 6 here. A part of the bar pattern 24 is focused as light and dark regions on the photosensitive detector elements 2 by means of beams passing through between the bars 6.

In addition, those end faces of the bars 6 which face outwards and those which face inward form two concentric, discontinuous circular lines which embody pattern elements symmetrical with respect to the pattern center. By means of the detector elements 2, it is possible here, particularly during a rotation of the bar pattern 24, to resolve the positions p4, p5, p6 and p7 of the entrances and exits of the respective bars 6 into and out of, respectively, the position-resolving region 21. With the positions p4, p5, p6 and p7 resolved in this manner, the effects of the eccentricity on a determination of the angle of rotation can then be computationally determined.

In a determination of an angle of rotation, either the positions of the focused bars 6 can be resolved via the light-dark transitions or the positions of the intermediate spaces thereof can be resolved via the light regions between the bars 6.

FIG. 11 shows a sixth embodiment which differs from the first embodiment only through a different formation of the pattern, in particular of the pattern elements oriented radially with respect to the pattern center and arranged one behind the other in the direction of rotation. Here, the pattern is formed by opaque triangles 7 on the transparent glass circle 3 shown only in FIG. 1. However, the rotating body rotatable about the axis could also be, for example, in the form of a thin metal disk, which in this case has triangular cut-outs which embody the pattern elements arranged one behind the other in the direction of rotation.

A—for example triangular—design of the pattern elements, in which facing lateral lines of adjacent pattern elements arranged one behind the other are formed so as to be substantially inclined toward the radial direction, has, owing to the additional inclination toward the radial direction, a greater sensitivity with respect to a determination of an eccentricity by the position-resolving region 21. It theoretically even permits a determination of the eccentricity e via a resolution of the width of a single triangle 7. Of course, it is also possible to determine the eccentricity from the distances between the triangles 7. By means of the present triangular shape of the pattern elements oriented in the direction of the pattern center, it is possible here on the other hand—in comparison to rectangular pattern elements of preceding embodiments—to provide fewer pattern elements arranged one behind the other, with the result that a smaller resolution is achievable.

Further developments of the invention in which at least one further, optionally diametrically arranged, detector is provided are also conceivable. From the additional information of the resolved positions of the further detector, sources of error other than the eccentricity, for example tumbling errors of the axis, could be made ineffective. Of course, the effects of the eccentricity can be determined even more accurately as a result of the additional information of the at least one further detector.

I claim:

1. A method for the accurate determination of an angle of rotation (w) by means of an optical detector (1) comprising a plurality of detector elements (2) arranged in series and by means of a rotating body (3) comprising a multiplicity of pattern elements (5, ..., 13) which are arranged around a pattern center (4) and a multiplicity of which is arranged one behind the other in the direction of rotation, which rotating body (3) is connected to the detector (1) so as to be rotatable about an axis (a), in which method at least some of the pattern elements (5, ..., 13) are focused by means of optical beams at least partly on detector elements (2), and positions (p) of the focused pattern elements (5, ..., 13) are resolved by means of the detector elements (2) of one and the same detector (1), wherein effects of an eccentricity (e) of the pattern center (4) relative to the axis (a) on the determination of an angle of rotation are determined computationally from resolved positions (p) of at least one of the pattern elements (5, .., 13), and wherein the angle of rotation (w) is accurately determined from resolved positions (p1, p2, p3) of a plurality of pattern elements (5, 6, 7) arranged one behind the other, taking into account the effects determined.

2. The method as claimed in claim 1, in which pattern elements (5) arranged one behind the other are combined into at least two groups (14, ..., 17), at least two group positions (p14, ..., p17) are computationally determined from the resolved positions of the respective combined pattern elements (5), and the effects of the eccentricity (e) on the determination of an angle of rotation are computationally determined from the at least two group positions (pl4, ..., p17) determined.

3. The method as claimed in claim 2, the at least two groups (16, 17) being separated from one another by pattern elements (5) arranged between the groups.

4. The method as claimed in any of claims 1 to 3, at least one of the pattern elements (8, ..., 13) being formed so as to be symmetrical with respect to the pattern center (4) in which method positions (p4, ..., p7) of the at least one focused, symmetrical pattern element (8, ..., 13) are resolved, and the effects of the eccentricity (e) on the determination of an angle of rotation are computationally determined with the aid of the resolved positions (p1., ..., p7) of the focused, symmetrical pattern element (8, ..., 13).

5. The method as claimed in claim 1, facing lateral lines of adjacent pattern elements (7) arranged one behind the other being inclined toward the radial direction, in which method dimensions of the pattern elements (7) arranged one behind the other and/or the distances between the pattern elements (7) arranged one behind the other are resolved by means of the detector elements (2), and the effects of the eccentricity (e) on the determination of an angle of rotation are computationally determined with the aid of the resolved dimensions of the pattern elements (7) or of the resolved distances.

6. An apparatus for the accurate determination of an angle of rotation (w), comprising an optical detector (1) which comprises a multiplicity of detector elements (2) arranged in series, and a rotating body (3) which is connected to the detector (1) so as to be rotatable about an axis (a) and has a multiplicity of pattern elements (5, ..., 13) arranged around a pattern center (4), a multiplicity of which is arranged one behind the other in the direction of rotation, at least some of the pattern elements (5, ..., 13) being capable of being focused by means of optical beams at least partly on detector elements (2), and positions (p) of the focused pattern elements (5, ..., 13) being capable of being resolved by means of the detector elements (2) of one and the same detector (1), wherein the optical detector elements (2) and pattern elements (5, ..., 13) are formed and arranged relative to one another in such a way that effects of an eccentricity (e) of the pattern center (4) relative to the axis (a) on the determination of an angle of rotation can be computationally determined from resolved positions (p) of at least one pattern element (5, ..., 13), and the angle of rotation (w) can be accurately determined from resolved positions (p1, p2, p3) of the pattern elements (5, 6, 7) arranged one behind the other, taking into account the effects.

7. The apparatus as claimed in claim 6, in which the pattern elements (5) arranged one behind the other in the direction of rotation are radially oriented and are substantially in the form of rectangular slits.

8. The apparatus as claimed in claim 7, in which at least two group positions (p14, ..., p17) can be computationally determined with the aid of the resolved positions of focused pattern elements (5) of at least two groups (14, ..., 17), which pattern elements are arranged one behind the other, and the effects on the determination of an angle of rotation can be computationally determined from the at least two group positions (p14, ..., p17) determined.

9. The apparatus as claimed in claim 8, in which the at least two groups (16, 17) are separated from one another on both sides by pattern elements (5) arranged one behind the other and not focused on the detector elements (2).

10. The apparatus as claimed in claim 6, in which facing lateral lines of adjacent pattern elements (7) arranged one behind the other are inclined toward the radial direction.

11. The apparatus as claimed in claim 10, in which the pattern elements (7) arranged one behind the other are formed so as to be radially oriented, and triangular or trapezoidal.

12. The apparatus as claimed in claim 6, in which at least one pattern element (8, ..., 13) is formed symmetrically with respect to the pattern center (4), as a circle, and effects on the determination of an angle of rotation can be computationally determined with the aid of at least one position (p4, ..., p7) of the symmetrical pattern element (8, ..., 13).

13. The apparatus as claimed in claim 6, in which the pattern elements (5, 6, 7) are formed and arranged in such a way that the angle of rotation can be determined incrementally or absolutely.

14. The apparatus as claimed in claim 6, in which the pattern elements (5) are embodied by transparent cut-outs in an opaque material layer (18).

15. The apparatus as claimed in claim 6, in which diffractive structures on the rotating body (3) are coordinated with the pattern elements.

16. The apparatus as claimed in claim 6, in which the rotating body (3) is in the form of a disk and is composed of glass, metal or plastic.

17. The apparatus as claimed in claim 6, in which the detector elements (2) are arranged in series substantially in the direction of rotation along a singles line.

18. The apparatus as claimed in claim 12, in which the at least one focused pattern element (8, ..., 13) formed symmetrically with respect to the pattern center is intersected by a single line of detector elements (2) arranged in series, in the form of a secant.

19. The apparatus as claimed in claim 6, in which the detector elements (2) are arranged in rows and columns in matrix form.

20. The apparatus as claimed in claim 6, in which the extension of the detector elements (2), at least in one direction, is greater than the extension of the focusable pattern elements (5, ..., 13).

21. The apparatus as claimed in claim 6, in which a single detector (1) is provided.

* * * * *

UNITED STATES PATENT AND TRADEMARK OFFICE
CERTIFICATE OF CORRECTION

PATENT NO. : 7,199,355 B2
APPLICATION NO. : 11/216217
DATED : April 3, 2007
INVENTOR(S) : Heinz Lippuner It is certified that error appears in the above-identified patent and that said Letters Patent is hereby corrected as shown below:

Column 13, line 5, "p1" should be -- p4 --.

Column 14, line 38, "singles" should be -- single --.

Signed and Sealed this

Twelfth Day of June, 2007

JON W. DUDAS
*Director of the United States Patent and Trademark Office*